United States Patent [19]

Ravault et al.

[11] 3,912,443

[45] Oct. 14, 1975

[54] RADIANT GAS BURNERS

[75] Inventors: Frank Ernest George Ravault; Bryan William Edwards, both of Birmingham, England

[73] Assignee: Foseco International Limited, Birmingham, England

[22] Filed: Aug. 28, 1973

[21] Appl. No.: 392,352

[52] U.S. Cl. .................................. 431/328; 431/329
[51] Int. Cl.² ........................................ F23D 13/12
[58] Field of Search ........................... 431/328, 329

[56] References Cited
UNITED STATES PATENTS

| | | | |
|---|---|---|---|
| 1,308,364 | 7/1919 | Lucke | 431/328 |
| 1,830,826 | 11/1931 | Cox | 431/328 |
| 2,194,208 | 3/1940 | Moran | 431/328 |
| 3,751,213 | 8/1973 | Sowards | 431/328 |
| 3,784,353 | 1/1974 | Chapvrin | 431/329 |

*Primary Examiner*—Carroll B. Dority, Jr.
*Assistant Examiner*—Larry I. Schwartz
*Attorney, Agent, or Firm*—Cushman, Darby & Cushsman

[57] ABSTRACT

A radiant gas heater including a radiant surface element consisting essentially of an inner gas distributing layer and an outer radiating layer of coarser structure than the inner layer, the inner layer being formed of finely pored highly permeable ceramic material of apparent porosity 70–90% and the outer layer of porous ceramic material of pore count 2–12 pores per linear cm and apparent porosity 90–99%.

4 Claims, 1 Drawing Figure

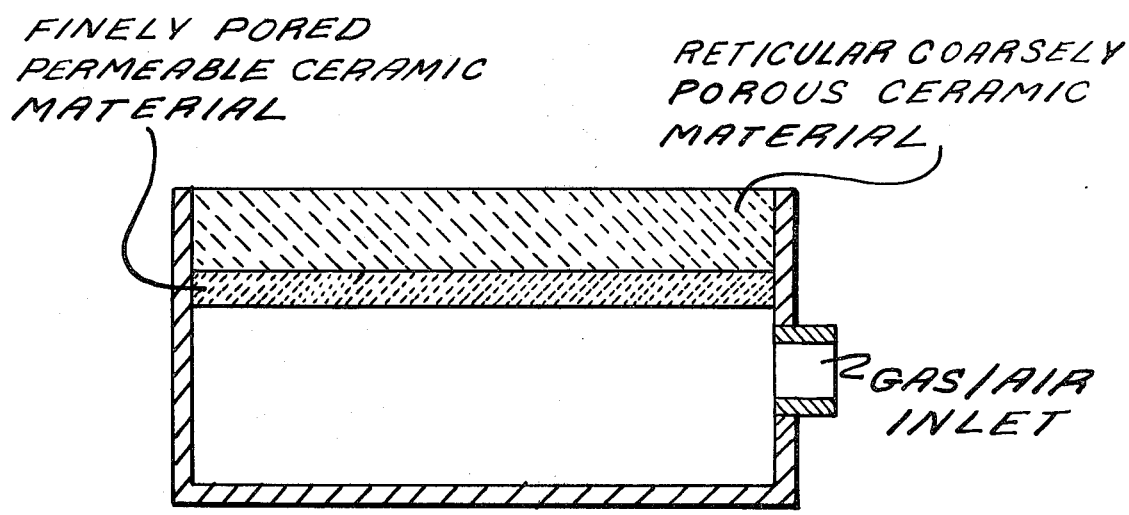

RADIANT GAS BURNERS

This invention relates to radiant gas burners.

There are many types of radiant gas heating elements known. Many suffer from a number of disadvantages, one of the most common being uneven burning.

According to the present invention there is provided a radiant gas heater comprising a radiant surface element including an inner gas distributing layer and an outer radiating layer of coarser structure than the inner layer, the inner layer being formed of finely pored highly permeable ceramic material of apparent porosity 70 – 95% and the outer layer of porous ceramic material of pore count 2 – 12 pores per linear cm and apparent porosity 90 – 99%. The outer layer is preferably a reticular porous ceramic material.

The apparent porosity of a material is the ratio of the volume of the open pores to the bulk volume of the material (see B.S.S. 1902: Part 1 A 1966, p.18).

In use a combustible mixture of gas and air is fed through the assembly, through the finely pored layer first. By adjusting the flow rate of the combustible mixture appropriately, the mixture is arranged to burn within the coarse-pored layer, which is accordingly heated to a high temperature and radiates heat very strongly. By choice of appropriate porous materials, the surface element may be adapted for use with the standard gas supply pressure prevailing in any given location.

It is naturally preferable to ensure that the porosity and permeability of the ceramic materials used in both layers are even and do not vary laterally across the layers.

Both the inner and the outer layer may be cellular ceramic materials. Such materials and methods of making them are described, for example in British patent specification Nos., 923862, 916784, 1004352, 1019807, and 1054421.

Using cellular ceramic materials of this type, very good results may be obtained. A preferred pore count for domestic gas pressures is 4 pores/cm for the radiant coarse pored layer and 20 pores/cm for the fine pored layer.

Alternatively, the inner gas distributing layer may be fibrous ceramic material, and may be bonded to the outer layer by first forming the outer layer in cellular ceramic material, filtering a ceramic fibre containing slurry through the outer layer, so as to form a fibrous mat interlocked into the surface cells of the outer layer, and finally drying by microwave heating or other suitable means.

Any inorganic fibre capable of withstanding the operating temperatures of the burner in oxidising conditions, for example, alumino-silicate fibre, asbestos, silica fibre or zirconia fibre, may be employed. Alumino-silicate fibre is preferred on account of its cost and absence of toxicity. Advantageously there may be used a blend of shorter fibres, which promote locking of the fibre pad into the surface cells of the cellular ceramic, with longer fibres, which impart permeability and mechanical strength to the fibre pad.

Water is preferred as the medium in which the fibres are dispersed to make a slurry, and a refractory bonding agent may be dissolved in the slurry or applied later to the formed fibre pad. Suitable refractory bonding agents include aluminium hydroxychloride, aluminium hydrogen orthophosphate, aluminium chromium hydrogen orthophosphate and alumina and silica hydrosols. Silica hydrosol is preferred.

The amount of fibre used should be preferably sufficient to yield a pad of 3 to 6 mm. thickness. A pad thinner than this may not adequately thermally insulate the gas-air mixture entering the burner through the fibre pad from the heat of the burner, and an explosion may result; on the other hand, a thicker pad will unnecessarily impede the passage of the gas mixture into the burner.

Depending on the type and average length of fibre employed, between 0.10 and 0.15 grams of fibre are required for every square centimetre of face area of the radiant surface element.

Generally, the thickness of the coarse pored layer will be 2–10 pores, preferably about 4 pores. If this layer is too thick, the amount of heat radiated will drop.

The sole FIGURE is a schematic cross-section of a gas burner embodying the principles of the present invention.

In the construction of a practical radiant gas burner as illustrated in the drawing, the two-layer elements may be encased in a suitable casing and the combustible gas mixture fed into the fine pored layer suitably. Feed may be from a plenum chamber into which gas and air are separately fed and become mixed, or mixing may take place remote from the burner element, and the mixture fed into the plenum chamber.

The burners are made according to this invention display exceptionally even burning characteristics with high thermal efficiency. The following examples will serve to illustrate the invention:

EXAMPLE I

A piece of 20 pores per linear cm cellular polyester polyurethane foam was cut measuring 28.6 cm by 4.8 cm thick, and a piece of 4 pores per linear cm reticular polyester polyurethane foam was cut measuring 28.6 cm by 1.3 cm thick. (These sizes allow for a subsequent 20% firing shrinkage).

A slurry was prepared according to the following composition:
  50 parts by weight of petalite having a particle size less than 75 microns
  50 parts by weight of china clay having a particle size less than 75 microns
  20 parts by weight of dextrin
  100 parts by weight of distilled water
  ½ part by weight of SILCOLAPSE 5000 silicone antifoam emulsion
  ½ part by weight of PERMANAL ANA antifoam The piece of cellular foam was dipped in the slurry and squeezed out between pieces of foam in the manner described in copending application 1928/72 to ensure a uniform permeability.

The piece of recticular foam was treated with a 0.01% solution in 50% methanol / 50% distilled water of an anionic polyacrylamide with an average molecular weight in the range of $3.10^6$ to $1.10^7$ and dried in a current of warm air. It was then dipped into the above slurry to which had been added 0.50 ml. of monoethanolamine per litre of slurry. It was then removed, surplus slurry drained and then centrifuged off, and the whole was then dried in a current of hot air. The resulting body was again treated with the above polyacrylamide solution, dried in a hot air current, dipped into the slurry containing monoethanolamine, and centrifuged.

The pieces of treated cellular and reticular foam were then placed one on top of another whilst still wet, weighted down with a suitable object, for example, a glass or polythene vessel containing water, and dried by microwave heating.

The resulting composite body was then heated in an electric muffle furnace to 300°C at a rate of 150° C/hr., then held for 2 hours at that temperature, then heated to 1250°C at a rate of 100° C/hr., then held for 16 hours at that temperature, and finally cooled to room temperature at a rate not exceeding 100° C/hr.

The so-produced laminated porous ceramic block was used to close a box of dimensions 22.9 cm. square to which was fed a mixture of 1 part natural gas and 11 parts air volume/volume at a pressure of 12.7 cm of water.

On igniting the gaseous mixture emerging from the face of the box, even combustion took place with the flame wholly inside the coarse-pored layer. The thermal emission of the surface under these conditions was 11.3 cals/cm²/sec.

EXAMPLE II

A piece of 4 pores per linear cm reticular polyester polurethane foam was cut measuring 19.1 cm square by 1.3 cm thick.

A slurry was prepared according to the following composition:

70 parts by weight of petalite having a particle size less than 75 microns.
30 parts by weight of china clay having a particle size less than 75 microns.
20 parts by weight of dextrin
100 parts by weight of water
½ part by weight of SILCOLAPSE 5000 silicone antifoam emulsion
½ part by weight of PERMANAL ANA antifoam The piece of reticular foam was treated with a 0.01% solution in 50% methanol / 50% distilled water of an anionic polyacrylamide with an average molecular weight in the range of $3.10^6$ to $1.10^7$ and dried in a current of warm air. It was then dipped into the above slurry to which had been added 50 ml. of monoethanolamine per litre of slurry. It was then removed, surplus slurry drained and then centrifuged off, and the whole was then dried in a current of hot air. The resulting body was again treated with the above polyacrylamide solution, dried in a hot air current, dipped into the slurry containing monoethanolamine, dried and centrifuged.

The coated reticular foam was then heated in an electric muffle furnace to 300°C at 150°C/hr, held for 2 hours at 300°C, heated to 1300°C at 100°C/hr, held for 16 hours at 1300°C, then cooled to room temperature at a rate not exceeding 100°C/hr.

The block of reticular ceramic thus produced, measuring 15.0 cm square as a result of firing shrinkage was used to close the upper surface of a box wherein it was supported on perforated metal sheet. The box was provided with means of drainage, of applying a vacuum, and of being oscillated in the horizontal plane in simple harmonic motion.

The box was filled with a silica hydrosol, containing 6% by weight of colloidal silica solids, until the hydrosol was level with the upper surface of the reticular ceramic.

A slurry was prepared by dispersing 15 grams of aluminosilicate fibre (average length 10 mm) and 15 grams of aluminosilicate fibre (average length 25 mm) in 1 litre of colloidal silica hydrosol containing 6% w/w colloidal silica solids.

The box was set into oscillating motion, and the slurry poured evenly over the upper face of the reticular ceramic block. The box was then allowed to drain, thus forming a fibrous mat interlocked into the surface cells of the reticular ceramic; the liquid drained off was retained for the preparation of future slurries.

Finally a vacuum was applied to the box and at the same time the upper surface of the fibrous mat was compressed by means of a platen of perforated metal, yielding a fibre pad of substantially uniform thickness, and the resulting duplex ceramic body was removed from the box and dried, by microwave heating.

The so-produced duplex block was used to close a box 15 cm square to which was fed a mixture of 1 part natural gas and 13 parts air volume/volume, at a pressure of 12.5 cm water.

On igniting the gaseous mixture emerging from the face of the box, even combustion took place with the flame wholly inside the coarse-pored layer. The thermal emission of the surface under these conditions was 15.1 cals/cm²/sec.

We claim as our invention:

1. A radiant gas heater including a radiant surface element consisting essentially of an inner gas distributing layer and an outer radiating layer of coarser structure than the inner layer, the inner layer being formed of finely pored highly permeable ceramic material of apparent porosity 70 – 95% and the outer layer of reticular porous ceramic material of pore count 2 – 12 pores per linear cm and apparent porosity 90 – 99%.

2. A heater according to claim 1 wherein the inner layer is formed of porous ceramic material of pore count 8 – 28 pores per linear cm.

3. A heater according to claim 1 wherein the inner layer is formed of fibrous ceramic material.

4. A heater according to claim 1 wherein the outer layer is 2 to 10 pores thick.

* * * * *

UNITED STATES PATENT OFFICE
CERTIFICATE OF CORRECTION

PATENT NO. : 3,912,443
DATED : October 14, 1975
INVENTOR(S) : Frank Ernest George Ravault and Bryan William Edwards It is certified that error appears in the above-identified patent and that said Letters Patent are hereby corrected as shown below:

<u>In the heading:</u>

Please add:

-- [30]  Foreign Application Priority Data
    September 25, 1972   Great Britain.....44216/72 and
    October 31, 1972    Great Britain.....50186/72

Signed and Sealed this eighth Day of June 1976

[SEAL]

Attest:

RUTH C. MASON
*Attesting Officer*

C. MARSHALL DANN
*Commissioner of Patents and Trademarks*